(No Model.) 2 Sheets—Sheet 1.
F. WHITE.
TRICYCLE.
No. 414,960. Patented Nov. 12, 1889.
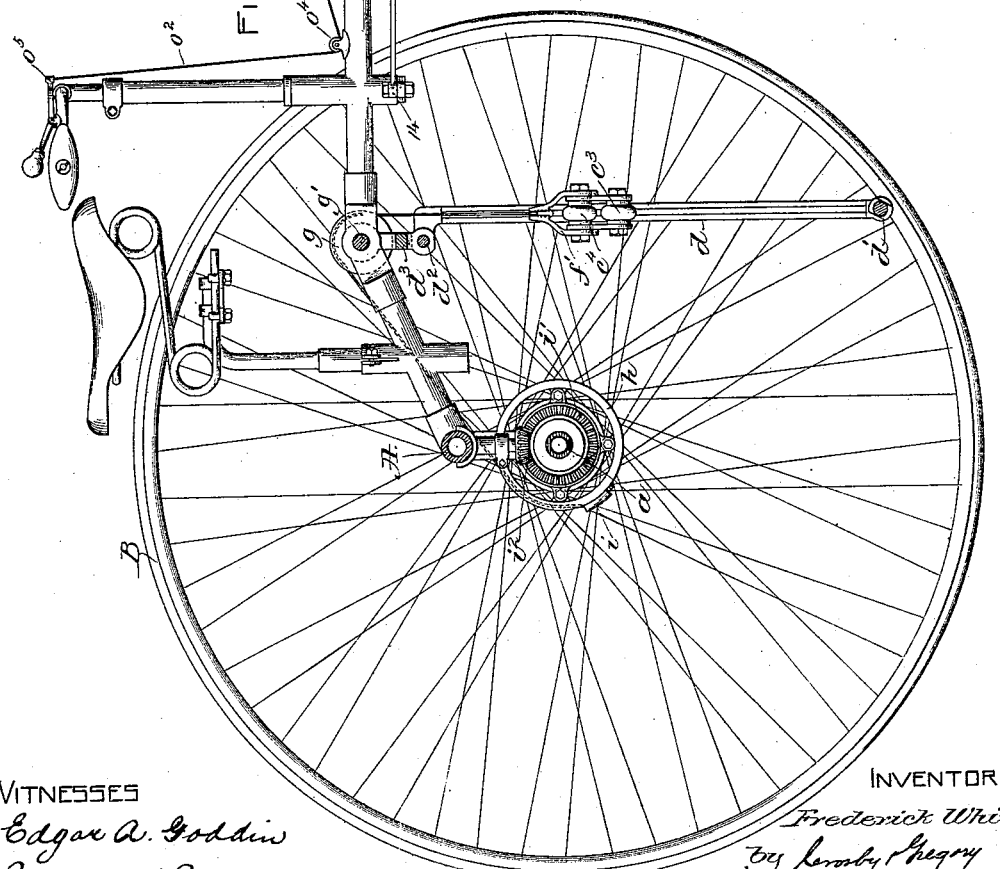
WITNESSES
Edgar A. Goddin
Frederick L. Emery
INVENTOR
Frederick White
by Crosby & Gregory
Attys

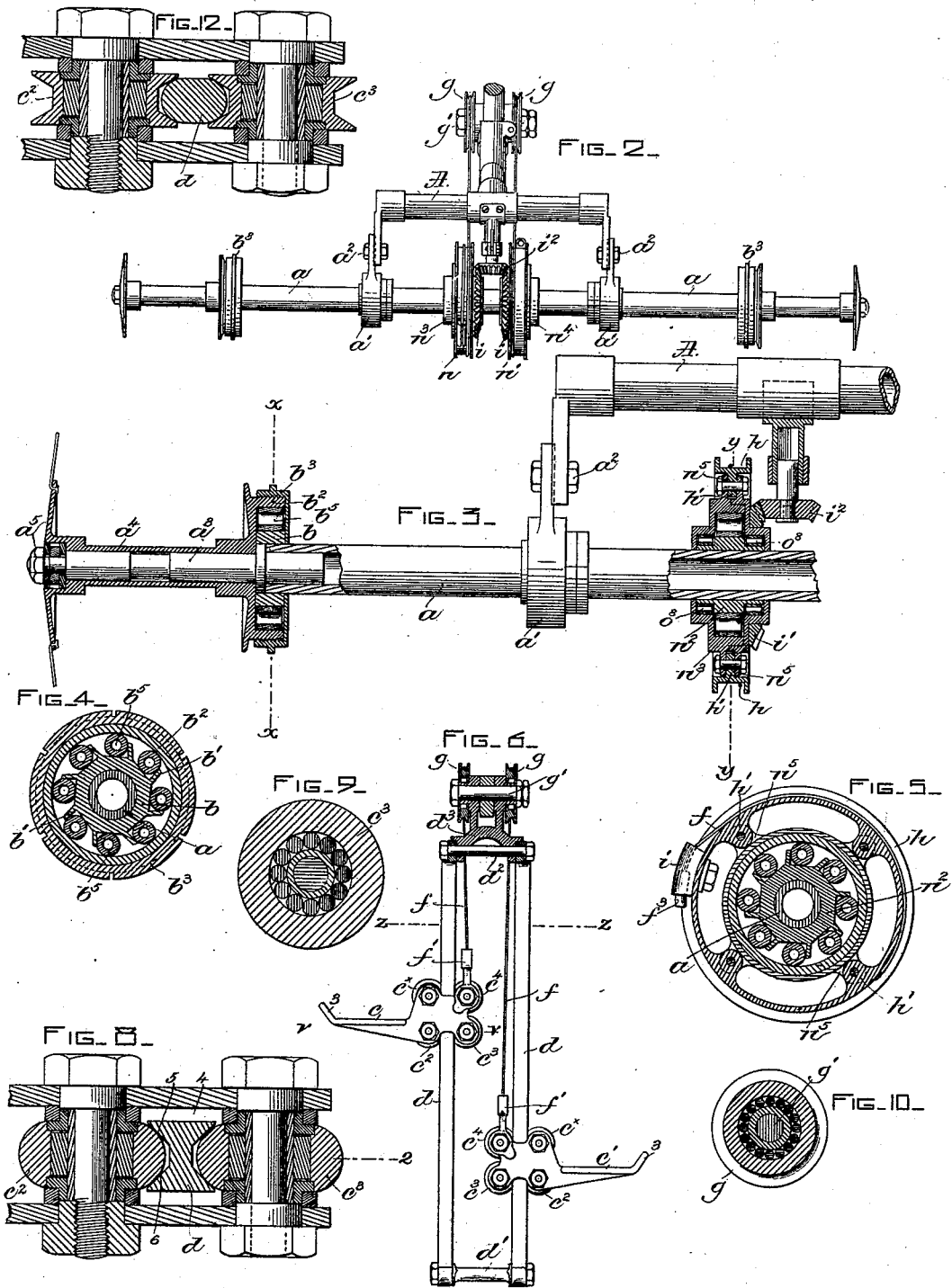

UNITED STATES PATENT OFFICE.

FREDERICK WHITE, OF WESTBOROUGH, MASSACHUSETTS, ASSIGNOR TO THE WHITE CYCLE COMPANY, OF PORTLAND, MAINE.

TRICYCLE.

SPECIFICATION forming part of Letters Patent No. 414,960, dated November 12, 1889.

Application filed January 2, 1889. Serial No. 295,193. (No model.)

*To all whom it may concern:*

Be it known that I, FREDERICK WHITE, of Westborough, county of Worcester, State of Massachusetts, have invented an Improvement in Tricycles, of which the following description, in connection with the accompanying drawings, is a specification, like letters on the drawings representing like parts.

This invention has for its object to construct a velocipede of the class commonly called "tricycles," which may be cheaply made, easily operated, and capable of attaining great speed.

In accordance with this invention the main shaft carries two drive-wheels, and said shaft is driven by pedals mounted to slide upon a guide-frame depending from the main frame-work of the machine, said pedals being connected with the drive-shaft by suitable cords and clutch mechanisms. The guide-frame is joined to the main frame to swing to accommodate the different positions of the rider on different inclinations or grades of the road. The steering-wheel is suitably mounted in the main frame-work and supplied with devices by which it may be operated.

The machine is provided with a suitable brake to be operated when desired, and also with a suitable seat.

Figure 1 shows in side elevation a velocipede embodying this invention, one of the drive-wheels and a portion of the drive-shaft being omitted; Fig. 2, a rear side view of the drive-shaft, showing the clutch mechanisms and hubs of the drive-wheels, also the seat-support; Fig. 3, an enlarged view of the drive-shaft shown in Fig. 2, one of the clutch mechanisms for imparting rotary motion to the shaft and the clutch mechanism by which motion is given to the wheels being shown in vertical section; Fig. 4, a section of the clutch mechanism of the wheel, taken on the dotted line $xx$; Fig. 5, a section of the clutch mechanism of the drive-shaft, taken on the dotted line $yy$; Fig. 6, a rear side view of the pedal guide-frame; Fig. 7, a section of the pedal guide-frame, taken on the dotted line $zz$, Fig. 6, looking down; Fig. 8, a partial section of one of the pedals, taken on the dotted line $vv$, Fig. 6; Fig. 9, a section of one of the rollers of the pedals, taken on the dotted line 2, Fig. 8; Fig. 10, a section of one of the grade-rollers over which the driving-cord passes, and Fig. 11 a detail of the guide-eye employed in connection with the brake-operating devices; Fig. 12, a modification of the pedal-guide and rollers.

The main frame-work A of the machine is of suitable shape to support the operating parts.

The driving-shaft $a$, preferably tubular, is held in suitable bearing-boxes $a'$ $a'$, attached to the main frame-work A by bolts $a^2$, said bearing-boxes preferably containing rollers which serve as bearings for the shaft.

The driving-shaft $a$ at each end has fitted into or secured to it a short shaft $a^3$, or said shaft may be made as an integral part of the driving-shaft.

The hubs $a^4$ of the drive-wheel B are mounted to rotate freely upon the shaft $a^3$, and held thereon by nuts $a^5$, secured upon the screw-threaded ends of the shafts, suitable washers being interposed. The hubs $b$ are secured to each end of the driving-shaft $a$, adjacent to or against the hubs of the drive-wheels, said hubs $b$ having a series of flat faces and tangentially-arranged projections $b'$ leading therefrom, as best shown in Fig. 4.

Each hub of each drive-wheel has an annular flange $b^2$, which incloses the hubs $b$, and a series of rollers, as $b^5$, are placed between the flange $b^2$ and the hub $b$, one roller bearing against each flat face of said hub and co-operating with its tangential projections $b'$. A shell or case $b^3$ is screwed upon each annular flange $b^2$ to inclose the operating parts and protect the same from dust.

The hub $b$, rollers $b^5$, and flange $b^2$ form a clutch by which rotary motion of the drive-shaft is imparted to the wheel, and in operation it will be seen that when the drive-shaft is revolving in one direction, as forward, for instance, the rollers become wedged between the flat faces of the hubs $b$ and the interior of the flange $b^2$, thereby revolving the wheel simultaneously with the shaft, but said clutch permitting the drive-wheels to be revolved in the opposite direction independently of the drive-shaft, the rollers stopping at the tangential projections $b'$, thereby throwing said rollers out of engagement. The pedals $c\ c'$, which consist of a frame having an upturned outer end 3, and provided with an opening 4 to receive a guide-rod $d$, said frame having mounted loosely therein four rollers or wheels $c^{\times}\ c^2\ c^3\ c^4$, two of which rollers, as $c^{\times}\ c^2$, bear against one side of the guide-rod $d$, and the other two rollers bear against the opposite side of the said guide-rod. The rollers or wheels $c^{\times}\ c^2\ c^3\ c^4$ have their bearing, as shown in Fig. 8, and the periphery of said rollers in cross-section is convex to follow in a groove formed in each side of the guide-rod, the said groove preferably being formed to present two inclined sides 5 6, with which the rollers come in contact. The rollers are placed in the frames to act or co-operate with the guide-rods loosely or freely, so as not to bind.

Each pedal-frame has attached to it a cord $f$, the opposite end of which is attached to a suitable clutch mounted upon the driving-shaft. As a preferable means of attachment for the cord $f$ each pedal has loosely connected with it or attached to it a yoke $f'$, provided with a slot $f^2$ and a suitable recess or cavity beneath it, a small block being secured to the end of the cord $f$, which is placed in the said cavity, the cord entering the slot $f^2$. The opposite end of the cord is provided with a small block $f^3$, which enters a recess or cavity formed in a slotted holder attached to the periphery of the clutch to be described, so that the said cords may be readily detached when desired. The cords $f$ pass upward over suitable pulleys or guide-rollers $g$, (see Fig. 10,) mounted loosely upon a stud $g'$, held in the main frame-work, said pulleys having roller-bearings. The cords $f$ then pass to and are connected with the clutches $n\ n'$.

The clutches $n\ n'$ are made substantially like the clutch before described for the drive-wheels, each clutch consisting of the hub $n^2$, fixed to the driving-shaft and having flat faces and tangential projections, and two shells or cases $n^3\ n^4$, adapted to fit upon the driving-shaft, inclose the hub $n^2$, and are provided with suitable ears $n^5$, formed upon their peripheries, through which ear-bolts are passed to secure the two shells together to form a tight chamber. Rollers are placed between the interior of the shell $n^3$ and the hub $n^2$, and rollers $o^8$ are also provided for the attached shells $n^3\ n^4$ to facilitate rotation upon the drive-shaft. The grooved rim $h$, having ears $h'$, inclose the shells, the said ears fitting between the ears $n^5$ of the shells $n^3\ n^4$ and having holes cut through them to receive the same bolt employed to hold the two shells together, so that by this means the grooved rim is fixed to the shells. The holding device $i$ for the cord $f$ is attached to this grooved rim.

At one side of each clutch—as, for instance, upon the side of the shells $n^3\ n^4$ adjacent to each other—are secured bevel-gears $i'$, which mesh with an intermediate gear $i^2$, held loosely in the frame-work A. These three gears serve as the reciprocating motion for the clutch, operating to raise one clutch to its normal position as one is being operated, and vice versa.

The clutches $n\ n'$ are designed to be reciprocated alternately in the following manner, namely: The two pedals $c\ c'$ normally rise about midway of the guide-rods $d$, and when one is depressed—as $c'$, for instance—its cord $f$ will rotate the clutch $n'$ forward, and by means of the bevel-gears the other clutch $n$ be rotated in the opposite direction, the cord upon it being wound, thereby lifting the pedal $c$, and when the said pedal $c$ is depressed the clutch $n$ will be rotated forward and the clutch $n'$ backward to lift the pedal $c'$. When either clutch is moved forward, the rollers become wedged between the hubs $n^2$ and the shells of the clutches, and thereby engage and rotate the driving-shaft, and by means of the clutch mechanism before described for the driving-wheels the said wheels will be rotated.

The two guide-rods $d\ d$, upon which the pedals $c\ c'$ slide, are joined by the connecting-rods $d'\ d^2$ at the bottom and top, respectively, the rod $d^2$ being held in a yoke $d^3$, mounted upon the stud $g'$, so that the guide-frame may swing upon a center coincident with the pulley over which the cords pass. This feature is of importance, as by it the rider may accommodate himself to various inclinations or grades in the road-bed by moving the guide-frame, which movement has no effect upon the cords. The cords may pass one or more times around the grooved rim $h$, as desired, and, to change the leverage of the machine, grooved rims of different diameters may be employed in connection with the driving-clutches, and hence I have shown the same as readily detachable.

The steering-wheel C is mounted in a yoke or frame C', preferably having roller-bearings, said yoke or rim inclining rearwardly and fitting loosely in a socket of the main frame-work A. The yoke has two lateral arms, as 12, one at each side, which are respectively connected with two corresponding arms, as 14, fixed to the lower end of the steering-rod by connecting-rods 15, and a handle-bar is attached to the upper end of the steering-rod, by which it is moved to change the position of the steering-wheel C.

The brake consists of a bent lever $o$, pivoted to the yoke of the steering-wheel, one arm of the said bent lever carrying the brake-shoe $o'$, and the other arm having attached to its upper end a cord $o^2$, which passes through a swivel guide-eye $o^3$, shaped as shown in Fig. 11, the cord thence passing beneath the roller $o^4$ and upward to connect with the outer end of the lever $o^5$, pivoted to the handle-bar, which lever $o^5$ is adapted to be operated by the hand of the rider.

In Fig. 12 is shown a modification of the guide-rods and pedals, wherein the guide-rod $d$ is convex in cross-section and the pulleys are grooved to roll thereon.

I claim—

1. In a velocipede, the driving-shaft and drive-wheels, two alternately-reciprocating clutches mounted upon the driving-shaft, combined with two sliding pedals and two independent flexible connections for connecting the pedals with the clutches, substantially as described.

2. In a velocipede, the driving-shaft and drive-wheels, and clutches for the driving-shaft, combined with the swinging frame, and pedals movable longitudinally thereon for operating the clutches, substantially as described.

3. In a velocipede, the driving-shaft and two alternately-reciprocating clutches, combined with two vertically-moving pedals and two independent cords or chains connecting the said clutches and pedals, and guide-pulleys over which the said cords pass, substantially as described.

4. In a velocipede, the driving-shaft and its two clutches, combined with two sliding pedals connected with the clutches by independent cords, pulleys over which the said cords pass, and the swivel guide-frame upon which the pedals slide, the said guide-frame swinging upon a center coincident with the pulleys over which the cords pass, substantially as described.

5. In a velocipede, the driving-shaft and its two alternately-reciprocating clutches, the drive-wheels and clutches for rotating them forward, combined with two vertically-moving pedals, and two independent cords or chains connecting the said pedals with the clutches for the driving-shaft, movement of the said pedals reciprocating said clutches alternately, substantially as described.

6. In a velocipede, the driving-shaft and alternately-reciprocating clutches, and the pedals, combined with independent detachable cords or chains connecting the pedals with the clutches, substantially as described.

7. In a velocipede, the driving-shaft, combined with the clutches for rotating it adapted to be reciprocated by independent driving cords or chains, said clutches having an external detachable rim around or partially around which the said cords or chains pass, substantially as described.

8. In a velocipede, the driving-shaft, its clutches $n\ n'$, having the toothed portions $i'$, combined with the intermediate gear $i^2$, and the cords or chains for reciprocating the clutch and the vertically-sliding pedals, substantially as described.

9. In a velocipede, the swinging pedal-carrying frame having the rods $d\ d$, combined with the pedals moving longitudinally upon said rods, substantially as described.

10. In a velocipede, the pedal-carrying frame, combined with the sliding pedals having several rollers adapted to co-operate with the guide-rods of the pedal-carrying frame to guide the pedals and also hold them in proper position, substantially as described.

11. In a velocipede, the driving-shaft, its alternately-reciprocating clutches $n\ n'$, their shells $n^3\ n^4$, the bevel-gears $i$, attached to said shells, and the intermediate gear $i^2$, interposed between the clutches and meshing with the gears $i$, substantially as described.

In testimony whereof I have signed my name to this specification in the presence of two subscribing witnesses.

FREDERICK WHITE.

Witnesses:
BERNICE J. NOYES,
MABEL RAY.